US006826708B1

(12) United States Patent
Michalewicz

(10) Patent No.: US 6,826,708 B1
(45) Date of Patent: Nov. 30, 2004

(54) METHOD AND SYSTEM FOR LOGGING DEBUGGING INFORMATION FOR COMMUNICATION CONNECTIONS

(75) Inventor: Larry G. Michalewicz, Allen, TX (US)

(73) Assignee: Cisco Technology, Inc., San Jose, CA (US)

( * ) Notice: Subject to any disclaimer, the term of this patent is extended or adjusted under 35 U.S.C. 154(b) by 542 days.

(21) Appl. No.: 09/742,466

(22) Filed: Dec. 20, 2000

(51) Int. Cl.[7] .............................................. G06F 11/00
(52) U.S. Cl. ........................... 714/4; 714/43; 379/9.03
(58) Field of Search ............................. 714/4, 43, 48; 379/9.03, 9.04

(56) References Cited

U.S. PATENT DOCUMENTS

| | | | | |
|---|---|---|---|---|
| 5,704,036 A | * | 12/1997 | Brownmiller et al. | 714/43 |
| 5,913,041 A | * | 6/1999 | Ramanathan et al. | 709/233 |
| 6,297,823 B1 | * | 10/2001 | Bharali et al. | 345/788 |
| 6,426,948 B1 | * | 7/2002 | Bowman-Amuah | 370/260 |
| 6,515,967 B1 | * | 2/2003 | Wei et al. | 370/244 |
| 6,516,055 B1 | * | 2/2003 | Bedeski et al. | 379/32.01 |
| 6,556,659 B1 | * | 4/2003 | Bowman-Amuah | 379/9.04 |
| 6,557,112 B1 | * | 4/2003 | Shimada | 714/4 |

* cited by examiner

*Primary Examiner*—Robert Beausoliel
*Assistant Examiner*—Bryce P. Bonzo
(74) *Attorney, Agent, or Firm*—Baker Botts L.L.P.

(57) ABSTRACT

A method and system for logging debugging information for a communication connection includes receiving a user initiated signal indicating a problem with a communication connection. In response to at least the user initiated signal, a type of debugging information not previously logged for the communication connection is logged for the communication connection.

18 Claims, 2 Drawing Sheets

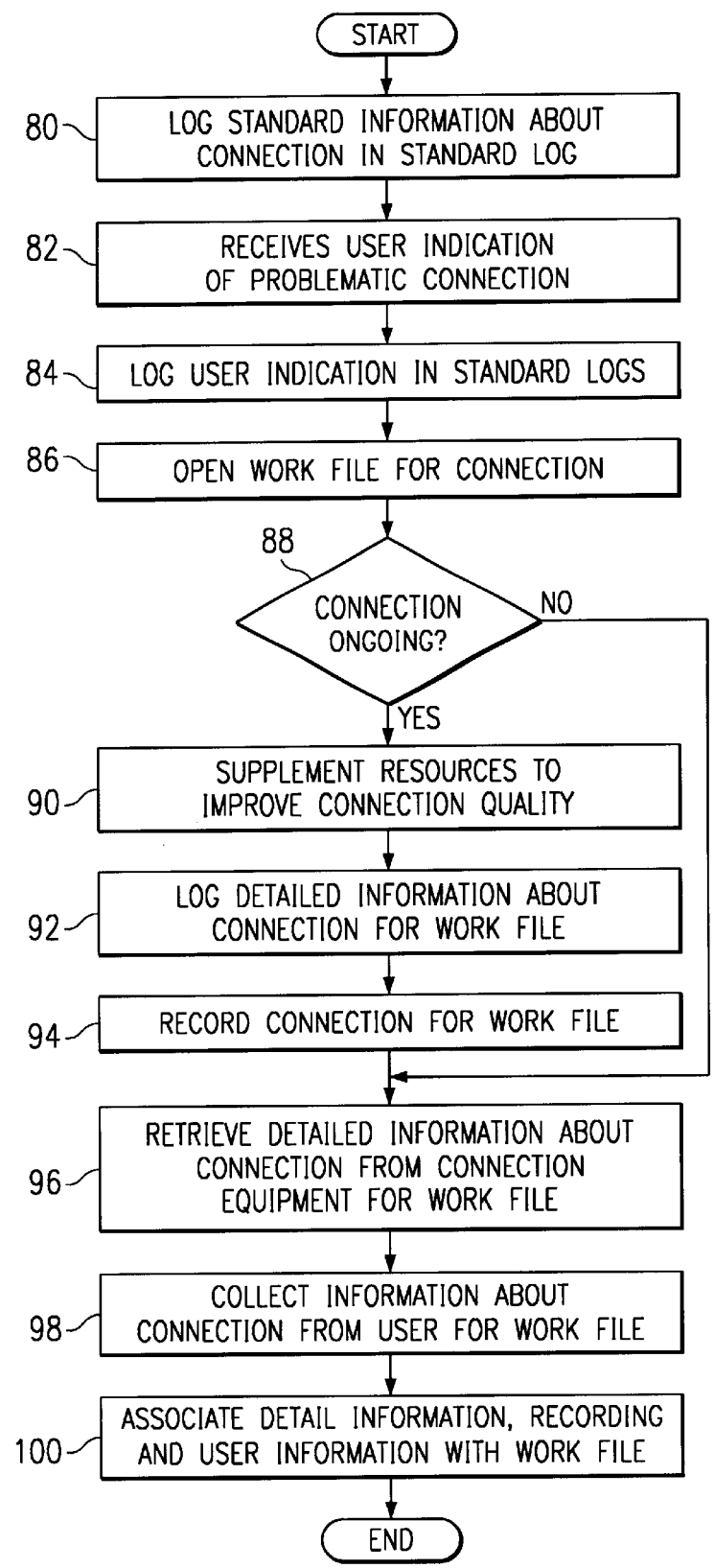

METHOD AND SYSTEM FOR LOGGING DEBUGGING INFORMATION FOR COMMUNICATION CONNECTIONS

TECHNICAL FIELD OF THE INVENTION

The present invention relates generally to communication systems, and more particularly to a method and system for logging debugging information for a communication connection.

BACKGROUND OF THE INVENTION

Telephones and other communication devices for exchanging electrical communications of audio information through public switch telephone networks (PSTN) have existed for a substantial time and are well understood. Recently, however, telephones have been created that exchange electrical communications of audio information through packet switched networks of the type which computers use to communicate with each other. These telephones use a digitized format that is broken down into discrete Internet Protocol (IP) or other message units to represent audible sound. These message units are sent and received through the packet switched network.

Unfortunately, exchanging electrical communications of audio information through a packet switched network presents a variety of problems. For example, when a stream of audible sounds such as a long sentence is broken into several message units and sent through the packet switched network some of the message units may not traverse the packet switched network at the same rate. Thus, the audible sounds represented by a first message unit could be transformed into audible sounds at a receiving telephone before the next message unit is received resulting in a gap in the audible sounds that is at least irritating if not unintelligible to the user. Errors in the packet transmission may also result in echo, scratchy audio, dropped calls, delay, and jitter.

Methods of notifying a repair staff through user reporting systems are ineffective in that they do not promptly notify the repair personnel or the users are unable to convey the relevant information, such as the time of the problem or the specific audio problem the user was encountering. Furthermore, often critical information is completely unavailable to the user, such as the packet loss rate, network congestion, specific devices through which calls are being routed, and other highly technical and transparent (to the user) information.

Previous attempts to solve these problems included allowing a user to initiate a one-second recording of a call by depressing a certain series of buttons on the telephone keypad. This functionality was not completely effective in that the particular second of audio recorded may not have been the segment of audio in which the user was experiencing a problem.

SUMMARY OF THE INVENTION

The present invention provides a method and a system for logging debugging information for communication connections that substantially eliminate or reduce the disadvantages and problems associated with previous systems and methods. In particular, the present invention provides a method and system for end-user initiation of event logging during or after a problematic connection to facilitate debugging and/or correction of the problem during or after the connection.

In accordance with one embodiment of the present invention, a method and system for logging debugging information for a communication connection comprises receiving a user initiated signal indicating a problem with a communication connection. In response to at least the user initiated signal, a type of debugging information not previously logged for the communication connection is logged for the communication connection.

More specifically, in accordance with a particular embodiment of the present invention, the debugging information comprises information about the user initiated signal. In another embodiment, the debugging information may comprise drop packet or other information about the communication connection. The debugging information may be retrieved from a communication device forming part of the communication connection. The communication device may be a user communication device such as a phone or a network element such as a conference bridge.

In accordance with another aspect of the present invention, a work file may be automatically opened for the communication connection in response to the user initiated signal. The debugging information logged for the communication connection is associated with the work file. The user may be automatically contacted to obtain additional information about the problem with the connection. In this embodiment, a response from the user is automatically associated with the work file.

Technical advantages of the present invention include providing an improved method and system for logging debugging information for communication connections. In a particular embodiment, end-users initiate logging activity during or after a problematic connection to facilitate debugging and/or error correction. Logging activity may be initiated by the user directly from a phone or communication device by pushing a button or other suitable command. As a result, the reporting rate of problems, including minor ones that the user may not ordinarily report but would be important to engineers is increased. This aids in identifying network and other problems occurring with one phone or one type of phone over the network. In addition, the efficiency of the trouble-shooting engines and debugging operations are improved by the identification and/or, detailed logging information on the calls that are actually problematic.

Another technical advantage of one or more embodiments of the present invention includes providing user initiated event logging for problematic connections. In particular, full and accurate information is recorded for problematic calls based on user input, which allows fast and efficient error correction. In addition, the need to log detailed information for each call is eliminated as detailed logging can be dynamically generated for problematic calls. This improves the quality of the system as a whole as resources are directed away from event logging when no error is present.

Still another technical advantage of one or more embodiments of the present invention includes providing user initiated identification of the problematic calls. In particular, user initiated log entries are included within logging information maintained for all calls. This assists the technicians analyzing detailed log reports in identifying and focusing on problems occurring within the system. In addition, a case for the service department may be automatically opened and an e-mail automatically sent to the user requesting details of the problem. This also allows automatic recording of audio for a call to preserve an audio track for engineers to study in determining the problem and the solution.

Yet another technical advantage of one or more embodiments of the present invention include providing user initiated dynamic correction for problematic calls. In particular, the user can identify an ongoing call as experiencing problems to the system to allow introduction of new components into the audio stream such as filters and buffer resources to improve call quality. Thus, in progress calls can be fixed and system resources only used as needed.

Other technical advantages of the present invention will be apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts in which:

FIG. 3 is a flow diagram illustrating a method for user initiated logging of debugging information and quality improvement for a connection in accordance with embodiment of the present invention.

DETAILED DESCRIPTION OF THE INVENTION

Figure 1:
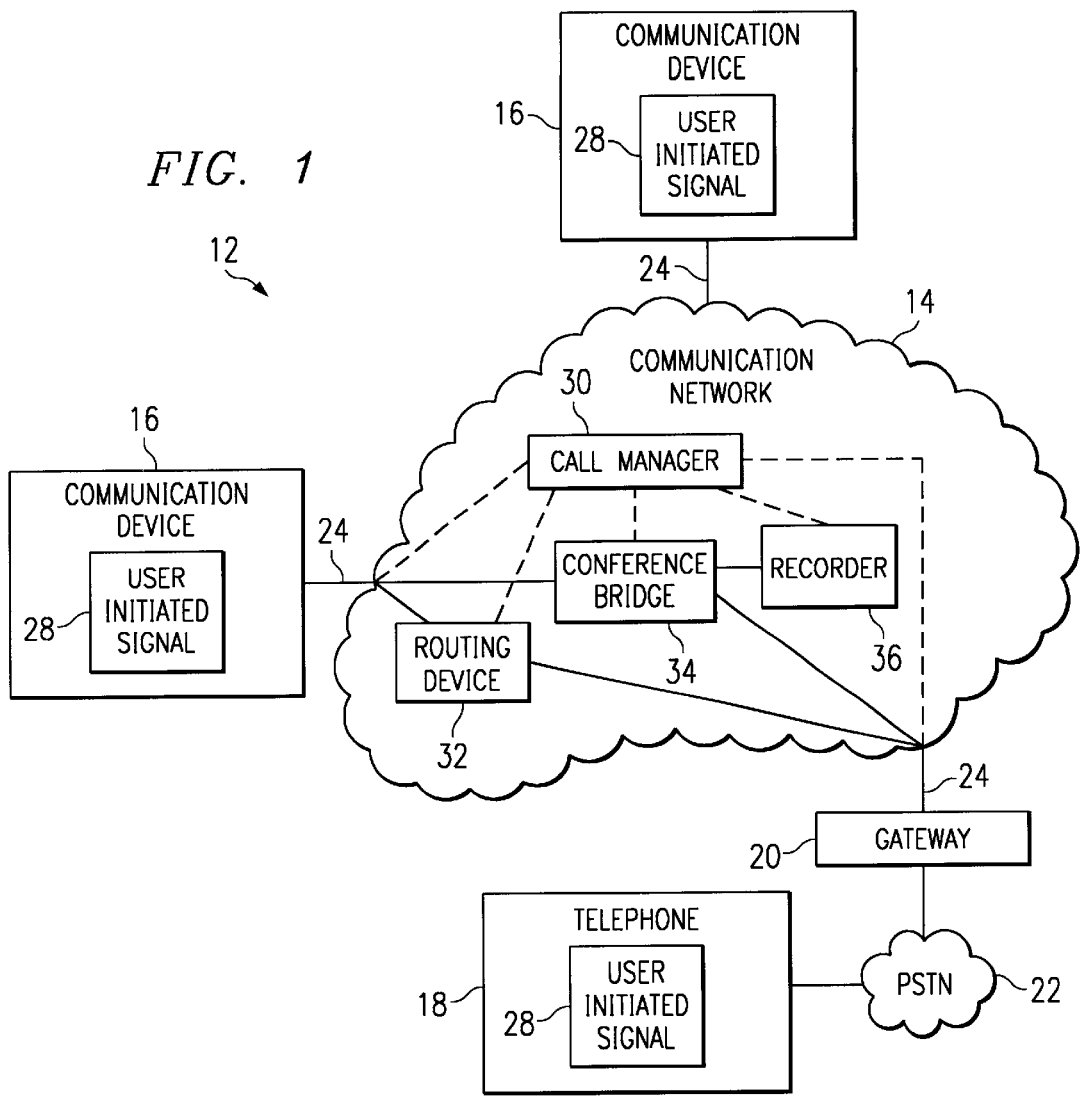
FIG. 1 is a block diagram illustrating a communications system in accordance with one embodiment of the present invention.

FIG. 1 illustrates a communications system 12 in accordance with one embodiment of the present invention. In this embodiment, the communications system 12 is a distributed system transmitting audio, video, voice, data and other suitable types of real-time and non-real-time traffic between source and destination endpoints.

Referring to FIG. 1, the communications system 12 includes a network 14 connecting a plurality of communication devices 16 to each other and to standard analog telephones 18 through a gateway 20 and the Public Switched Telephone Network (PSTN) 22. The communication devices 16, standard analog telephones 18 and gateway 20 are connected to the network 14 and/or PSTN 22 through twisted pair, cable, fiberoptic, radio frequency, infrared, microwave and/or any other suitable wire line or wireless link 24.

In one embodiment, the network 14 is the Internet, a wide area network (WAN), a local area network (LAN), or other suitable packet-switched network. In the Internet embodiment, the network 14 transmits Internet protocol (IP) packets and includes a plurality of routers and/or other suitable network elements operable to direct the IP packets between source and destination endpoints. Telephony voice information is transmitted in the voice over IP (VoIP) format. Real-time IP packets such as VoIP packets are encapsulated in real-time transport protocol (RTP) packets for transmission over the network 14. It will be understood that the network 14 may comprise any other suitable type of network and that traffic may be otherwise suitably transmitted using other protocols and formats.

The communication devices 16 comprise IP or other digital telephones, personal or other suitable computers or computing devices, personal digital assistance (PDAs), cell or other mobile telephones or any other suitable handheld or other device capable for communicating real-time audio, video and/or other information over the network 14. The communication devices 16 also communicate control information with the network 14 to control call set up, tear down and processing as well as call services.

In the Internet embodiment, the communication devices 16 communicate voice traffic in the VoIP format. The standard analog telephones 18 communicate standard telephony signals through PSTN 22 to the gateway 20. At the gateway 20, the signals are converted to IP packets in the VoIP format. As previously described, the IP packets from the communication devices 16 and the gateway 20 are encapsulated in the RTP protocol for transmission over the network 14.

The communication devices and telephones 16 and 18 each include a user initiated signal 28 operable to indicate a technical or other suitable problem with an ongoing or recently terminated communication connection. As used herein, each means everyone of at least a subset of the identified items. The problem may be a dropped call, dropped packets, interference, static or other disruptions in the communication connection. The communication connection may be a VoIP connection, audio connection, video connection, real-time connection and/or other suitable connections between remote devices.

The user initiated signal 28 is initiated by the user on or in connection with a communication device 16 or telephone 18 and forwarded to the communications network 14 or other suitable control system. The user initiated signal 28 indicates to the communication network 14 or other control element that the user has experienced or is experiencing a problem with the connection and may initiate logging of debugging information, initiate supplemental logging of debugging information and/or initiate real-time error correction for the connection. The user initiated signal 28 may be initiated by a button or voice activated or other command on the communication devices and telephones 16 and 18 or a sequence of buttons or commands. For example, the user initiated signal 28 may be initiated by a hard key, a soft key, a feature button or a sequence of key pad key presses.

The network 14 includes a call manager 30, routing devices 32, a conference bridge 34 and a recorder 36. The call manager 30, conference bridge 34 and recorder 36 may be located in a central facility or have their functionality distributed across and/or at the periphery of the network 14. The call manager 30, routing devices 32, conference bridge 34 and recorder 36 are connected to the network 14 by any suitable type of wire line or wireless links. In a particular embodiment, network 14 may operate without the call manager 30, in which case the communication devices 16 and gateway 20 may communicate control information directly with each other or with other suitable network elements.

The call manager 30 sets up, tears down and otherwise manages communication connections across the network 14. The communication connections may be between two or more parties. The parties may be persons and/or equipment such as computers. The connections may be real-time connections, connections having real-time characteristics and/or non-real-time connections.

The call manager 30 is responsive to service requests from the communication devices 16 and the standard telephones 18. For example, the call manager 30 may provide voicemail, bridging, multicasting, call hold and other suitable services for the communication devices 16 and standard telephones 18. In one embodiment, the call manager 30 is responsive to the user initiated signals 28 indicating a problem with a communication connection. In this embodiment, the call manager 30 may initiate logging of debugging information for the problematic connection, initiate logging one or more additional types of debugging information for the connection, initiate recording the connection and/or initiate dynamic reallocation of network resources to correct the problem with the connection.

The routing device 32 is an IP router, switch, multiplexer or other network element capable of directing traffic through the network 14 between the communication devices 16 and/or telephone 18. The routing device 32 and network buffer, filtering and other call processing resources are responsive to the call manager 30 to allow dynamic reallocation of resources to support real-time correction of problematic connections.

The conference bridge 34 is a standard or other suitable conference bridge responsive to the call manager 30. The conference bridge 34 is operable to bridge a connection between communication devices 16 and/or telephone 18 and the recorder 36. The recorder 36 records one or more audio or other suitable segments of the connection and forwards the segments to the call manager 30 for debugging of problematic connections. The recorder 36 may record the connection on a magnetic tape or may store a digital version of the traffic stream.

Figure 2:
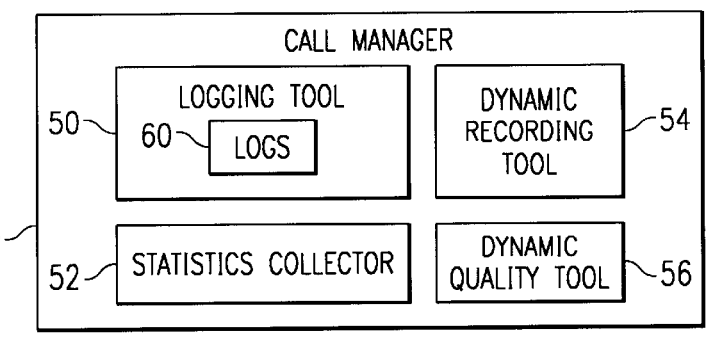
FIG. 2 is a block diagram illustrating details of the call manager of FIG. 1 and in accordance with one embodiment of the present invention.

FIG. 2 illustrates details of the call manager 30 in accordance with one embodiment of the present invention. In this embodiment, call manager 30 is a centralized node in the communications network 14. As previously described, the functionality of the call manager 30 may be distributed across the network 14.

Referring to FIG. 2, the call manager 30 includes a logging tool 50, a call statistics collector 52, a dynamic recording tool 54 and a dynamic quality tool 56. As described in more detail below, the logging tool 50, call statistics collector 52, dynamic recording tool 54 and/or dynamic quality tool 56 provide, in response to the user initiated signal 28, event logging during or after a problematic connection to facilitate debugging and/or correction of the problem during or after the connection. Debugging information, recordings and resource reallocation may be applied to each stream of a connection or to only one stream.

The logging tool 50, call statistics collector 52, dynamic recording tool 54, dynamic quality tool 56 and other components of the call manager 30 or elements of the network 14, as well as the communication devices 16, telephones 18 and gateway 20 may comprise logic encoded in media. The logic comprises functional instructions for carrying out programmed tasks. The media comprises computer disks or other suitable computer-readable media, application specific integrated circuits (ASIC), field programmable gate arrays (FPGA), digital signal processor (DSP) or other suitable specific or general purpose processors, transmission media or other suitable media in which logic may be encoded and utilized.

The logging tool 50 records debugging information for communications connections across the network 14. Debugging information is information directly or indirectly indicating a problem and/or solution to a problem with a connection, diagnostic information or other suitable information from which the problem and/or solution can be determined or derived.

The logging tool 50 includes one or more logs 60 storing debugging information for the communication connections. The logging tool 50 may store debugging information for each connection or connection type in a shared log, or file, or in separate logs, or group calls into sets of logs. Debugging information may be logged for all calls or other suitable connections or only for connections identified by users or otherwise as experiencing problems.

In a particular embodiment, basic information is logged for all real-time voice connections, with more detailed information logged for problematic connections identified by the user. In this embodiment, a master log records debugging information for all of the connections and a separate detail log is opened for each connection identified by a user with the user initiated signal 28 as problematic. High level events such as off hook, dialing, parties of a call, states of a call manager 30 and receipt of user initiated signals 28 are recorded in the master log. Detailed debugging information such as call statistics gathered by the network 14, communications devices 16 and/or gateway 20 are recorded in the detailed log for a problematic connection. The detailed logs may also include information on the state of the communications devices 16, telephone 18 and/or gateways 20, one or more recordings for the connection received from the recorder 36 and supplemental debugging information provided by the user. The supplemental information may be received in response to an e-mail or other communication automatically generated by the call manager 30 in response to the user initiated signal 28. The detailed logs may be automatically opened in response to the user initiated signal 28 and the data retrieved from the communications gateway 20 or other suitable devices and stored or otherwise associated with the detailed log, or file.

The call statistics collector 52 collects call statistics from the communication devices 16 or gateway 20 for a problematic connection. The collected information is stored in log 60 of logging tool 50. The call statistics include dropped packets and other information collected by the communication devices 16, gateway 20 or other periphery devices.

The dynamic recording tool 54 initiates and controls recording of a problematic connection. In particular, the dynamic recording tool 54 routes a connection through the conference bridge 34 to the recorder 36 for recording of one or more short, one to two seconds, or long, over five or ten seconds, segments. The recordings are transferred to or associated with the log 60. In other embodiments, the dynamic recording tool 54 may itself record a problematic connection or, if the connection is already being routed through a recorder, activate the recorder.

The dynamic quality tool 56 is operable in response to the user initiated signal 28 to dynamically reallocate resources for a connection to correct, minimize or lessen a problem with a connection. The dynamic quality tool 56 may reroute a connection by communicating with the routing devices 32, add buffer length as necessary to prevent or lessen dropped packets or apply filters. Accordingly, a problematic connection may be dynamically fixed or improved. In addition, resource use may be minimized for connections with additional resources only being allocated as needed.

FIG. 3 illustrates a method for user initiated logging of debugging information and quality improvement for a problematic connection in accordance with one embodiment of the present invention. In this embodiment, basic, or standard information is logged for each connection with detailed information logged for connections identified by the user as problematic. It will be understood that logging may only be performed for problematic connections without departing from the scope of the present invention.

Referring to FIG. 3, the method begins at step 80 in which standard information for a communication connection is logged. The information is recorded in a standard, or centralized log. At step 82 the user initiated signal 28 indicating a problem with the connection is received. Next, at step 84, receipt of the user initiated signal 28 is logged in the standard log.

Next, at step 86, a work file is opened for the connection. The work file includes a problem log for collecting detailed debugging information recorded for the connection. At decisional step 88, the call manager 30 determines if the connection is active or otherwise ongoing. If the connection is ongoing, the Yes branch of step 88 leads to step 90.

At step 90, the dynamic quality tool 56 supplements resources for the connection to improve the quality of the connection. At step 92, detailed debugging information about the connection is logged in the problem log of the work file. At step 94, a segment of the connection is recorded for the work file. This segment may be recorded directly by the dynamic recording tool 54 or recorded by the recorder 36 in response to instructions from the dynamic recording tool 54.

Step 94, as well as the No branch of decisional step 88 lead to step 96. At step 96, after or during a problematic connection, detailed information about the connection is retrieved from the communications equipment 16, gateway 20 and/or other network elements handling the call. This information is stored in the detailed log of the work file or otherwise associated the detailed log and/or work file.

Proceeding to step 98, information about the problematic connection is collected from the user for the work file. In one embodiment, the information is collected by automatically generating an e-mail, transmitting the e-mail to the user and associating a response received from the user with the work file. The e-mail may include Yes/No or other suitable questions the answers to which will assist in determining and correcting the problem with the connection.

Proceeding to step 100, the detailed information collected for the connection, the recording and the user information is stored in or with or otherwise associated with the work file. Step 100 leads into the end of the process by which debugging information is logged for a problematic communication connection and/or the connection is fixed in response to a user initiated signal. In this way, the efficiency of troubleshooting operations are improved by the identification and/or detailed logging information on connections that are actually problematic.

Although the present invention has been described with several embodiments, various changes and modifications may be suggested to one skilled in the art. It is intended that the present invention encompass such changes and modifications as fall within the scope of the appended claims.

What is claimed is:

1. A method for logging debugging information for a communication connection, comprising:

receiving a user initiated signal indicating a problem with a communication connection; and in response to at least the user initiated signal logging a type of debugging information for the communication connection not previously logged for the communication connection, wherein logging the type of debugging information comprises retrieving the type of debugging information from communication equipment forming a part of the communication connection, wherein the communication equipment comprises a network element, and wherein the network element comprises a conference bridge.

2. A method for logging debugging information for a communication connection, comprising:

receiving a user initiated signal indicating a problem with a communication connection;

in response to at least the user initiated signal, logging a type of debugging information for the communication connection not previously logged for the communication connection; and routing the communication connection through a conference bridge after the receipt of the user initiated signal for recording of the communication connection.

3. A method for logging debugging information for a communication connection, comprising:

receiving a user initiated signal indicating a problem with a communication connection;

in response to at least the user initiated signal, logging a type of debugging information for the communication connection not previously logged for the communication connection;

automatically opening a work file for the communication connection in response to at least the user initiated signal; and automatically associating debugging information logged for the communication connection with the work file.

4. A method for logging debugging information for a communication connection, comprising:

receiving a user initiated signal indicating a problem with a communication connection;

in response to at least the user initiated signal, logging a type of debugging information for the communication connection not previously logged for the communication connection;

automatically contacting the user to request additional information about the problem with the communication connection; and automatically associating additional information from the user with the work file.

5. A method for logging information for a communication connection, comprising:

logging a first set of debugging information about a communication connection; receiving a user initiated signal indicative of a problem with the communication connection; and in response to at least the user initiated signal, logging a second set of debugging information about the communication connection, the second set of debugging information including disparate information from the first set, wherein the communication connection comprises a real time voice connection.

6. The method of claim 5, wherein the real time voice connection comprises a voice over Internet protocol (VoIP) connection.

7. A system for logging debugging information for a communication connection, comprising:

logic encoded on media;

the logic operable to receive a user initiated signal indicating a problem with a communication connection and, in response to at least the user initiated signal, to log a type of debugging information for the communication connection not previously logged for the communication connection;

the logic operable to log the type of debugging information by retrieving the type of debugging information from communication equipment forming a part of the communication connection;

wherein the communication equipment comprises a user communication device; and wherein the user communication device comprises a voice over Internet protocol (VoIP) telephone.

8. A system for logging debugging information for a communication connection, comprising:
   logic encoded on media;
   the logic operable to receive a user initiated signal indicating a problem with a communication connection and, in response to at least the user initiated signal, to log a type of debugging information for the communication connection not previously logged for the communication connection;
   the logic operable to log the type of debugging information by retrieving the type of debugging information from communication equipment forming a part of the communication connection;
   wherein the communication equipment comprises a network element; and
   wherein the network element comprises a conference bridge.

9. A system for logging debugging information for a communication connection, comprising:
   logic encoded on media;
   the logic operable to receive a user initiated signal indicating a problem with a communication connection and, in response to at least the user initiated signal, to log a type of debugging information for the communication connection not previously logged for the communication connection; and
   the logic further operable to route the communication connection through a conference bridge after receipt of the user initiated signal for recording of the communication connection.

10. A system for logging debugging information for a communication connection, comprising:
    logic encoded on media;
    the logic operable to receive a user initiated signal indicating a problem with a communication connection and, in response to at least the user initiated signal, to log a type of debugging information for the communication connection not previously logged for the communication connection; and
    the logic further operable to automatically open a work file for the communication connection in response to at least the user initiated signal and to automatically associate debugging information logged for the communication connection with the work file.

11. A system for logging debugging information for a communication connection, comprising:
    logic encoded on media;
    the logic operable to receive a user initiated signal indicating a problem with a communication connection and, in response to at least the user initiated signal to log a type of debugging information for the communication connection not previously logged for the communication connection;
    the logic further operable to automatically open a work file for the communication connection in response to at least the user initiated signal and to automatically associate debugging information logged for the communication connection with the work file; and
    the logic further operable to automatically contact the user to request additional information about the problem with the communication connection and to automatically associate additional information from the user with the work file.

12. A method for logging debugging information for a connection, comprising:
    logging a first set of debugging information for a real-time voice connection;
    receiving a user initiated signal indicating a problem with the real-time voice connection;
    logging receipt of the user initiated signal;
    opening a work file for debugging the real-time voice connection;
    logging a second set of debugging information for the real-time voice connection in response to at least the user initiated signal, the second set of debugging information comprising debugging information of a type not in the first set of debugging information;
    recording an audio segment of the real-time voice connection in response to the user initiated signal; and
    associating the second set of information and the recorded segment with the work file.

13. A system for logging information for a communication connection, comprising:
    means for receiving a user initiated signal indicating a problem with a communication connection; and
    means in response to at least the user initiated signal, for logging information for the communication connection not previously logged for the communication connection,
    wherein the means for logging the type of debugging information for the communication connection comprises means for retrieving the type of debugging information for the communication connection from communication equipment forming a part of the communication connection;
    wherein the communication equipment comprises a user communication device; and
    wherein the user communication device comprises a voice over Internet protocol (VoIP) telephone.

14. A system for logging information for a communication connection, comprising:
    means for receiving a user initiated signal indicating a problem with a communication connection; and
    means in response to at least the user initiated signal, for logging information for the communication connection not previously logged for the communication connection;
    wherein the means for logging the type of debugging information for the communication connection comprises means for retrieving the type of debugging information for the communication connection from communication equipment forming a part of the communication connection;
    wherein the communication equipment comprises a network element; and
    wherein the network element comprises a conference bridge.

15. A system for logging information for a communication connection, comprising:
    means for receiving a user initiated signal indicating a problem with a communication connection;
    means in response to at least the user initiated signal, for logging information for the communication connection not previously logged for the communication connection; and
    means for routing the communication connection through a conference bridge after receipt of the user initiated signal for recording of the communication connection.

16. A system for logging information for a communication connection, comprising:
- means for receiving a user initiated signal indicating a problem with a communication connection; and
- means in response to at least the user initiated signal, for logging information for the communication connection not previously logged for the communication connection;
- means for automatically opening a work file for the communication connection in response to at least the user initiated signal; and
- means for associating debugging information logged for the communication connection with the work file.

17. A system for logging information for a communication connection, comprising:
- means for receiving a user initiated signal indicating a problem with a communication connection; and
- means in response to at least the user initiated signal, for logging information for the communication connection not previously logged for the communication connection;
- means for automatically contacting the user to request additional information about the problem with the communication connection; and
- means for automatically associating additional information from the user with the work file.

18. A method for logging debugging information for a communication connection, comprising:
- receiving a user initiated signal indicating a problem with a communication connection; and
- in response to at least the user initiated signal, logging a type of debugging information for the communication connection not previously logged for the communication connection, wherein the user communication device comprises a voice over Internet protocol (VoIP) telephone.

* * * * *

UNITED STATES PATENT AND TRADEMARK OFFICE
CERTIFICATE OF CORRECTION

PATENT NO. : 6,826,708 B1
DATED : November 30, 2004
INVENTOR(S) : Larry Michalewicz It is certified that error appears in the above-identified patent and that said Letters Patent is hereby corrected as shown below:

<u>Title page,</u>
Item [56], References Cited, U. S. PATENT DOCUMENTS,
insert the following:

| | | | | |
|---|---|---|---|---|
| -- 5,365,514 | 11/15/1994 | Hershey et al. | 370 | 17 |
| 5,377,196 | 12/27/1994 | Godlew et al. | 371 | 20.1 |
| 5,446,874 | 08/29/1995 | Waclawsky et al. | 395 | 575 |
| 5,521,907 | 05/28/1996 | Ennis, Jr. et al. | 370 | 17 |
| 6,044,398 | 03/28/2000 | Marullo et al. | 709 | 219 |
| 6,065,059 | 05/16/2000 | Shieh et al. | 709 | 233 |
| 6,078,953 | 06/20/2000 | Vaid et al. | 709 | 223 |
| 6,137,777 | 10/24/2000 | Vaid et al. | 370 | 230 |
| US 6,175,838 B1 | 01/16/2001 | Papierniak et al. | 707 | 223 |
| US 6,182,111 B1 | 01/30/2001 | Inohara et al. | 709 | 201 --. |

<u>Column 7,</u>
Line 56, after "signal", insert -- , --;

<u>Column 8,</u>
Line 41, after ";", start "receiving" on line 42;

<u>Column 9,</u>
Line 54, after "signal", insert -- , --;

<u>Column 10,</u>
Line 27, after "connection", delete "," and insert -- ; --.

Signed and Sealed this

Twenty-first Day of March, 2006

JON W. DUDAS
*Director of the United States Patent and Trademark Office*